L. DOUGLAS.
MECHANICAL MOVEMENT.
APPLICATION FILED JULY 23, 1914.
1,174,972.
Patented Mar. 14, 1916.
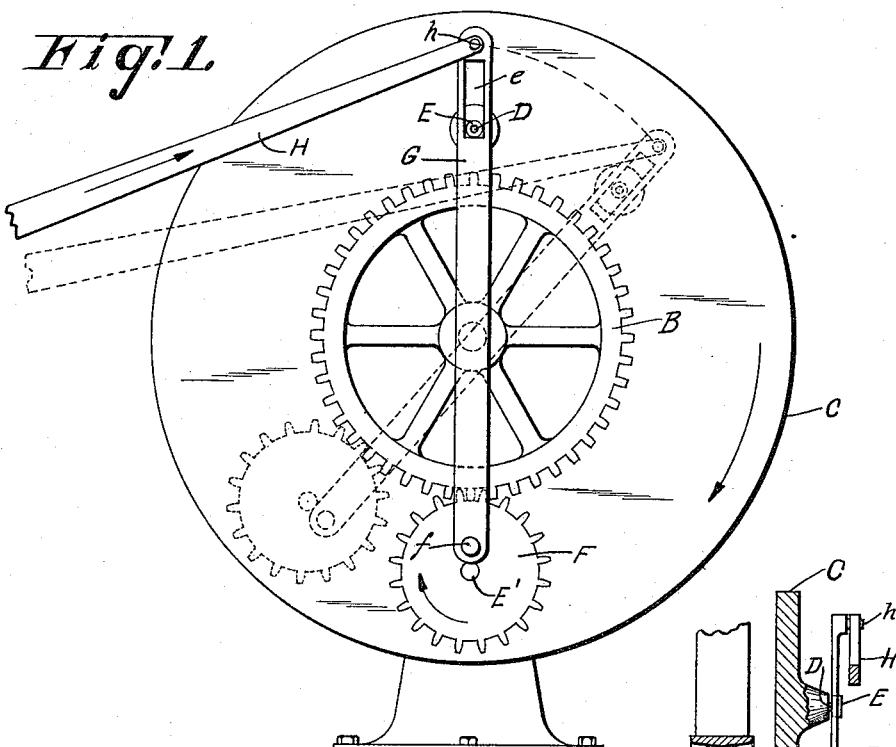
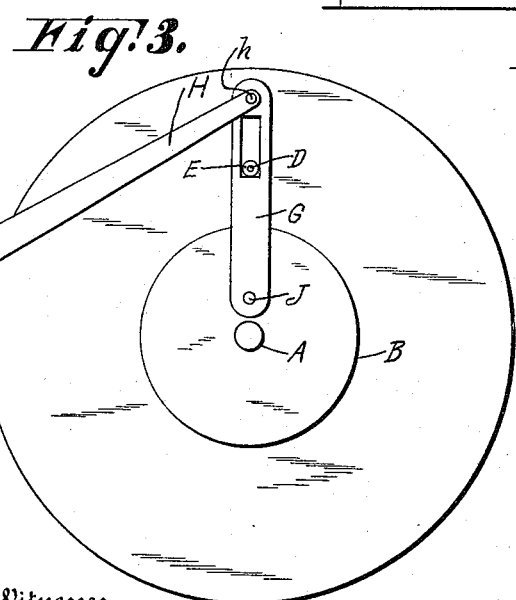
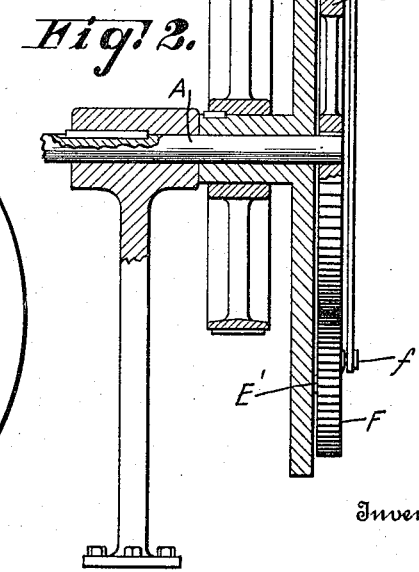
Inventor
Lee Douglas
By Erwin E. Wheeler
Attorneys
Witnesses
J. A. Otto
Josephine Mazzoni

UNITED STATES PATENT OFFICE.

LEE DOUGLAS, OF MADISON, WISCONSIN.

MECHANICAL MOVEMENT.

1,174,972.   Specification of Letters Patent.   Patented Mar. 14, 1916.

Application filed July 23, 1914. Serial No. 852,549.

*To all whom it may concern:*

Be it known that I, LEE DOUGLAS, a citizen of the United States, residing at Madison, county of Dane, and State of Wisconsin, have invented new and useful Improvements in Mechanical Movements, of which the following is a specification.

My invention relates to improvements in devices for converting reciprocal into rotary motion, my object being to increase the effectiveness of the driving stroke or strokes by prolonging the interval of maximum or substantially maximum leverage and proportionately shortening the interval during which the actuating member approaches and crosses the so called dead center line.

In the drawings Figure 1 is an illustration in side elevation of a mechanical movement embodying my invention. Fig. 2 is a vertical sectional view of the same, drawn to a plane exposing the wheel supporting shaft. Fig. 3 is a side elevation, showing a modified form of construction.

Like parts are identified by the same reference characters throughout the several views.

A supporting shaft A is provided with a wheel B, fast thereon, and which is illustrated as a gear wheel in Figs. 1 and 2. The shaft A and gear wheel B are non-rotatable or at least relatively so. A wheel C is rotatably mounted upon the shaft A and is provided with a projecting crank pin D, having an anti-friction roller E thereon. Diametrically opposite the crank pin D, a stud shaft E′ projects from the wheel C and a gear wheel F, journaled upon said stud shaft, has its teeth in mesh with the teeth of the stationary gear wheel B. The bar G is pivoted to the side of the gear wheel F at $f$ and is provided with a slot $e$ which receives the roller E. A connecting rod H is pivotally secured to the extremity of the bar G adjacent to the slot $e$ by a coupling pin $h$. The bar G extends across the end of the stationary shaft A but is unconnected therewith.

With the above described construction and arrangement of parts, it is obvious that when the connecting rod H moves in the direction indicated by the arrow in Fig. 1, the bar G will tend to swing upon the pivot pin $f$, and in so doing will push upon the roller E and crank pin D, thereby causing wheel C to rotate in the direction indicated by the arrows thereon. The reactionary pressure of the bar G upon the pivot pin $f$ will tend to rotate gear wheel F in the opposite direction, but the teeth on this gear wheel being in mesh with the teeth on gear wheel B, and gear wheel F being journaled on the rotating wheel C, it is obvious that the rotation of gear wheel C will carry gear wheel F to the left in Fig. 1 and simultaneously rotate it in the direction indicated by the arrow on gear wheel F. The effect of this will be to impart a relative movement of the pivot pin $f$ to the right and along a circular path encircling the stud shaft E′. Therefore the entire bar G will have a relative movement to the right and the coupling pin $h$ will follow the path indicated by the dotted line in Fig. 1, instead of following a circle having the shaft F as its center.

Gear wheel F is one-half the diameter of the gear wheel B and it will therefore revolve a one-half revolution while traveling through an arc of 90° along the periphery of the gear wheel B. This revolving or rolling movement of the gear wheel F carries the pivot pin $f$ around to the opposite side of stud shaft E′, the slot $e$ in the bar G permitting this movement. The continued movement of the wheel C will again project the bar G at the end having the coupling pin $h$, after this end of the bar G crosses the dead center line. The path traveled by the coupling pin $h$ will therefore be a flattened ellipse, with a comparatively straight path across the dead center line and a long working stroke on each side of said line, the force being exerted not only at an elongated radius, but through a flattened arc, whereby the stroke is extended in the direction in which the force is exerted.

Referring to Fig. 3, it will be observed that the gear wheel F, shown in Figs. 1 and 2, is eliminated, and bar G is pivoted directly to the side face of the wheel B between shaft A and crank pin D, but at a point J comparatively near to the shaft A. With this construction the coupling pin $h$ swings at a shorter radius than it would swing if connected directly with the wheel C, but owing to the fact that the fulcrum pin J, upon which lever G swings, is located above the axis upon which wheel C turns, the effective stroke in the upper half of the revolution of coupling pin $h$ will be lengthened along the face of the upper half of wheel C. The return stroke will be correspondingly shortened along the lower half of the wheel C. This apparatus may be employed advantageously in cases where the power is applied through the connecting rod H only once during a single revolution of wheel C. The path of the coupling pins *h* will therefore follow a curve similar to that indicated in Fig. 1, since wheel B is relatively stationary.

I claim:—

1. The combination with a rotary wheel, of a relatively stationary member, a connecting rod operating reciprocally in a plane substantially parallel to the plane of wheel rotation, an intermediate power transmitting member, and a connection between the power transmitting member and said relatively stationary member adapted to shift the power transmitting member during wheel rotation to carry the end of said connecting rod eccentrically about the axis of the wheel, a coupling connection between said connecting rod and intermediate member, and a sliding connection between said intermediate member and the wheel.

2. The combination with a supporting shaft of a rotary wheel carried by said shaft, a relatively stationary gear wheel also supported by said shaft, a pinion journaled on the rotary wheel and meshing with said gear wheel, a lever pivotally connected with the pinion at one side of the pinion axis, and having sliding connection with the rotary wheel on the opposite side of the shaft axis, and a connecting rod coupled to said lever.

3. The combination with a rotary wheel, of a relatively stationary wheel, a pinion mounted upon the rotary wheel in a position to travel in rolling contact with the periphery of the stationary wheel, and a motion transmitting member for the rotary wheel pivotally connected with the pinion, and having sliding connection with the rotary wheel.

4. The combination with a rotary wheel, of a relatively stationary wheel, a pinion mounted upon the rotary wheel in a position to travel in rolling contact with the periphery of the stationary wheel, and a motion transmitting member for the rotary wheel pivotally connected with the pinion, and having sliding connection with the rotary wheel, said sliding connection comprising a roller journaled on said wheel in rolling interacting contact with portions of said motion transmitting member.

In testimony whereof I affix my signature in the presence of two witnesses.

LEE DOUGLAS.

Witnesses:
P. J. MURPHY,
PEARL VAUGHN.

Copies of this patent may be obtained for five cents each, by addressing the "Commissioner of Patents, Washington, D. C."